US007629036B2

(12) United States Patent
Chomik et al.

(10) Patent No.: US 7,629,036 B2
(45) Date of Patent: Dec. 8, 2009

(54) ODOR CONTROL CASSETTE

(75) Inventors: Richard S. Chomik, Middlesex, NJ (US); Mark Yoho, Chagrin Falls, OH (US); Jeffrey Brown, Charlotte, NC (US)

(73) Assignee: Playtex Products, Inc., Westport, CT (US)

( * ) Notice: Subject to any disclaimer, the term of this patent is extended or adjusted under 35 U.S.C. 154(b) by 189 days.

(21) Appl. No.: 11/483,809

(22) Filed: Jul. 10, 2006

(65) Prior Publication Data

US 2006/0251842 A1 Nov. 9, 2006

Related U.S. Application Data

(63) Continuation of application No. 10/947,843, filed on Sep. 23, 2004, now Pat. No. 7,073,311, which is a continuation of application No. 10/032,693, filed on Jan. 2, 2002, now abandoned.

(51) Int. Cl.

| | |
|---|---|
| ***B29D 22/00*** | (2006.01) |
| ***B29D 23/00*** | (2006.01) |
| ***B32B 1/08*** | (2006.01) |

(52) U.S. Cl. .................. 428/36.1; 428/500; 428/36.92; 206/576

(58) Field of Classification Search ................ 428/36.9, 428/36.91, 500, 35.7, 220, 36.1, 36.92; 206/576; 53/567, 459, 469; 422/5, 28, 32
See application file for complete search history.

(56) References Cited

U.S. PATENT DOCUMENTS

| | | | | |
|---|---|---|---|---|
| 3,602,924 | A | 9/1971 | Kneisley | 4/142 |
| 3,619,822 | A | 11/1971 | Carmichael | |
| 3,693,193 | A | 9/1972 | May | 4/142 |
| 3,723,999 | A | 4/1973 | Miller | 4/142 |
| 3,935,692 | A | 2/1976 | Miller | 53/126 |
| 3,936,403 | A | 2/1976 | Sakaguchi et al. | 260/23 |
| 4,107,258 | A | 8/1978 | Angell, Jr. et al. | 264/328 |
| 4,303,710 | A | 12/1981 | Bullard et al. | 428/35 |
| 4,416,197 | A | 11/1983 | Kehl | 100/214 |
| 4,427,110 | A | 1/1984 | Shaw, Jr. | 206/205 |
| 4,516,387 | A | 5/1985 | Kupcikevicius | 53/530 |
| 4,519,104 | A | 5/1985 | Nilsson | 4/484 |
| 4,618,528 | A | 10/1986 | Sacks et al. | 428/216 |
| 4,696,857 | A | 9/1987 | Sibilia et al. | 428/323 |
| 4,869,049 | A | 9/1989 | Richards et al. | 53/459 |
| 4,890,934 | A | 1/1990 | Feaver et al. | 383/10 |
| 4,911,985 | A | 3/1990 | Jenkins et al. | 428/446 |
| 4,934,529 | A | 6/1990 | Richards et al. | 206/303 |
| 4,954,391 | A | 9/1990 | Kotani et al. | 428/220 |
| 5,056,293 | A | 10/1991 | Richards et al. | 53/116 |

(Continued)

FOREIGN PATENT DOCUMENTS

| | | |
|---|---|---|
| JP | 0281801 | 3/1990 |

(Continued)

*Primary Examiner*—Michael C Miggins
(74) *Attorney, Agent, or Firm*—Ohlandt, Greeley, Ruggiero & Perle, L.L.P.

(57) ABSTRACT

A film is provided for use in a cassette. Preferably, the cassette is used in a waste disposal system. The film is a high density polyethylene film resin having both a low melt index and a high density, thereby providing improved odor control capabilities and enhanced tear strength and assembly strength.

20 Claims, 2 Drawing Sheets

Cell set-up for isostatic permeation test.

U.S. PATENT DOCUMENTS

| | | | | |
|---|---|---|---|---|
| 5,125,526 | A | 6/1992 | Sumanis | 220/263 |
| 5,129,735 | A | 7/1992 | Neal et al. | 383/109 |
| 5,385,259 | A | 1/1995 | Bernstein et al. | 220/404 |
| 5,392,591 | A | 2/1995 | Simpson | 53/435 |
| 5,464,189 | A | 11/1995 | Li | 251/4 |
| 5,520,303 | A | 5/1996 | Bernstein et al. | 220/404 |
| 5,535,913 | A | 7/1996 | Asbach et al. | 220/404 |
| 5,590,512 | A | 1/1997 | Richards et al. | 53/567 |
| 5,651,231 | A | 7/1997 | Garland | 53/258 |
| 5,655,680 | A | 8/1997 | Asbach et al. | 220/404 |
| 5,765,339 | A | 6/1998 | Garland | 53/258 |
| 5,778,642 | A | 7/1998 | Fuss et al. | 53/567 |
| 5,782,067 | A | 7/1998 | Fuss et al. | 53/576 |
| 5,799,909 | A | 9/1998 | Ziegler | 248/101 |
| 5,813,200 | A | 9/1998 | Jacoby et al. | 53/567 |
| 5,826,404 | A | 10/1998 | Fuss et al. | 53/459 |
| 5,962,598 | A | 10/1999 | Mack et al. | 525/333.8 |
| 6,003,162 | A | 12/1999 | Kishi et al. | 4/484 |
| 6,052,842 | A | 4/2000 | He | 4/484 |
| 6,058,520 | A | 5/2000 | Hawkins et al. | 4/484 |
| 6,065,272 | A | 5/2000 | Lecomte | 53/576 |
| 6,128,890 | A | 10/2000 | Firth | 53/567 |
| 6,147,167 | A | 11/2000 | Mack et al. | 525/333.8 |
| 6,316,546 | B1 | 11/2001 | Ong et al. | 525/53 |
| 6,355,733 | B1 | 3/2002 | Williams et al. | 525/191 |
| 6,370,847 | B1 | 4/2002 | Jensen et al. | 53/459 |
| 2002/0038535 | A1 | 4/2002 | Jensen et al. | 53/459 |
| 2002/0042472 | A1 | 4/2002 | Ong et al. | 525/53 |
| 2002/0170275 | A1 * | 11/2002 | Salman et al. | 53/459 |

FOREIGN PATENT DOCUMENTS

| | | |
|---|---|---|
| JP | 2000318742 | 11/2000 |
| WO | WO0242364 | 5/2002 |

* cited by examiner

Cell set-up for isostatic permeation test.

ODOR CONTROL CASSETTE

RELATED APPLICATIONS

This application is a continuation of, and claims priority in, U.S. patent application Ser. No. 10/947,843, filed Sep. 23, 2004 now U.S. Pat. No. 7,073,311, which is a continuation of, and claims priority in, U.S. patent application Ser. No. 10/032,693, filed Jan. 2, 2002 now abandoned, the disclosures of which are incorporated herein by reference.

BACKGROUND OF THE INVENTION

1. Field of the Invention

The present invention relates to a flexible tubing for use in a cassette dispenser for a diaper or similar waste disposal device. More particularly, the present invention relates to barrier films used for flexible tubing in such cassettes.

2. Description of the Related Art

Diaper disposal devices have become popular for the convenient and sanitary disposal of diapers and related waste. A conventional diaper disposal device has a pail that serves as a storage chamber accessed via a closable lid and, a cassette positioned in the pail and having a tubular core with a length of flexible tube stored in the core. The diaper disposal system operates by depositing a soiled diaper into the pail, rotating the core, and twisting the flexible tube to create a seal above the diaper. A second diaper may be disposed of by opening the lid, inserting the second diaper, and pushing the previous sealed diaper further into the storage chamber. A new seal is created by twisting the tube above the newly deposited diaper. The process can continue until the pail is filled. Consequently, the device stores the discarded diapers in a series of individually wrapped packages in the storage chamber. Each package is separated from adjacent packages by twists in the tubing. Such a packaging and disposal system is described in U.S. Pat. No. 5,813,200, assigned to Playtex Products, Inc., the assignee of the present invention. A cassette for use in a diaper disposal system is described in U.S. Pat. No. 4,934,529 to Richards et al., also assigned to Playtex Products, Inc.

Diaper disposal containers, in addition to aiding in the discrete and sanitary disposal of human waste, also provide a method of reducing malodor by containing the waste in sealed packages of flexible tubing. The flexible tubing currently employed in the art is formed of a substantially air-impermeable material such as Formosa E905 or Formosa FPC. However, the odor reduction capability of a tubing formed of Formosa resin is limited by its permeability. Over time, a significant amount of odiferous gas permeates through the tubing material into the environment. Less permeable materials have not been employed in the art because they are ill-suited for the conversion process in which film from a roll is inserted into a cassette. Less permeable materials are brittle and the insertion process creates splits or openings in the film. Such splits are axially formed, as a result of the molecular orientation of the film during the blowing process. Also, the rigidity of less permeable materials renders them ill-suited to the twisting required for operation of a cassette.

SUMMARY OF THE INVENTION

It is an object of the present invention to provide a flexible tube or tubing material for use in a cassette of a waste disposal system.

It is another object of the present invention to provide such a cassette in which the flexible tube has barrier properties that substantially reduce malodor from discarded diapers.

It is still another object of the present invention to provide a flexible tube material for use in a cassette of a waste disposal system that is resistant to tearing and splitting.

It is a further object of the present invention to provide such a flexible tube material that is inexpensive and easy to manufacture.

These and other objects and advantages of the present invention are provided by the use of a flexible tube material for use in a cassette of a waste disposal system, in which the flexible tube material has both improved odor control capabilities and enhanced tear strength. The tube material of the present invention is made of a high density polyethylene (HDPE) film resin that exhibits a low melt index in combination with a high molecular weight. The HDPE film resin exhibits both (1) odor barrier properties by reducing the amount of odiferous gas that may penetrate the film, resulting in better odor control, and (2) enhanced or higher tear strength, enabling the HDPE material's functionality in a cassette.

BRIEF DESCRIPTION OF THE DRAWINGS

The foregoing and still other objects and advantages of the present invention will be more apparent from the following detailed explanation of the preferred embodiments of the present invention in connection with the accompanying drawings.

DETAILED DESCRIPTION OF THE INVENTION

Figure 1:
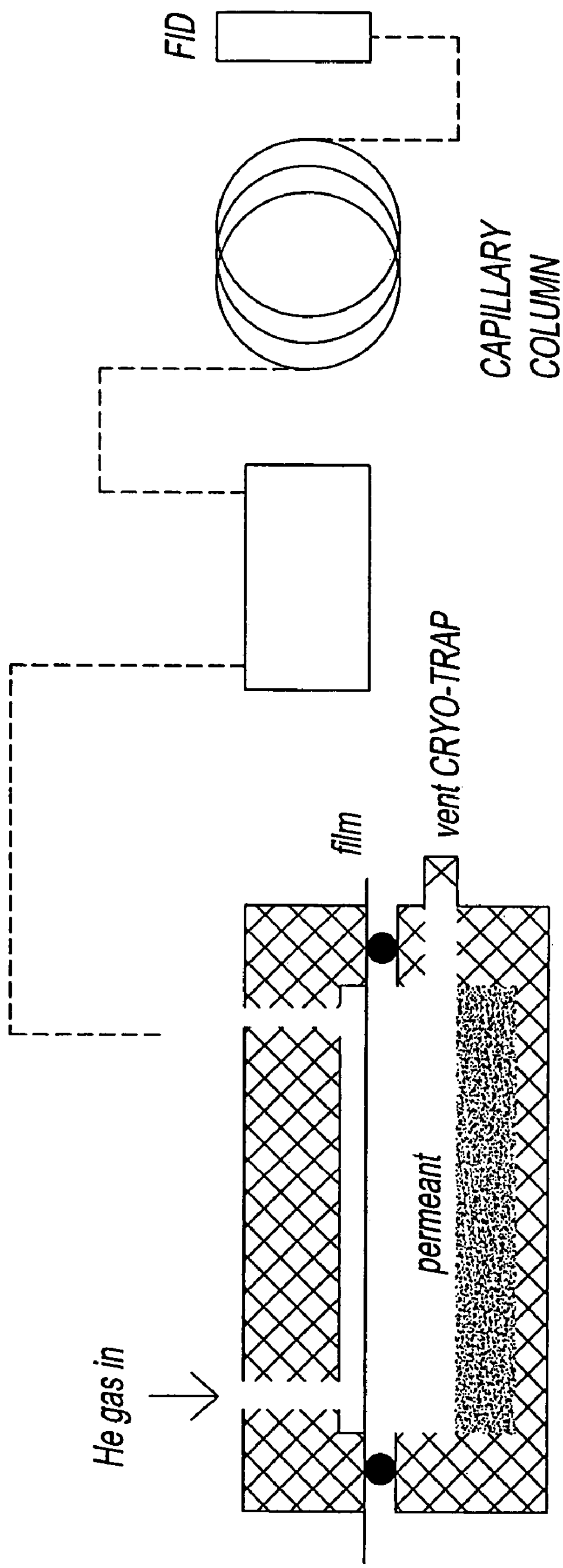
FIG. 1 illustrates the cell set-up for the isostatic permeation test.

The present invention is described in the context of a cassette for use in a disposal system, preferably a diaper disposal pail or system. However, the dimensions and design of the cassette may be modified to accommodate any waste material having an unpleasant odor. Other such applications may include use in a trash can, a medical waste receptacle, or a chemical waste receptacle.

The cassette tube or tubing material has improved odor control capabilities and enhanced tear strength. The cassette tube material is formed of a high density polyethylene film resin that exhibits a low melt index in combination with a high molecular weight. These attributes insure that both barrier properties and tear strength are retained. The melt index of the tube material is in the range of 0.04 g/10 min to 0.50 g/10 min, and preferably is 0.10 g/10 min. The density of the tube material is in the range of 0.90 g/cm$^3$ to 0.99 g/cm$^3$ and preferably is 0.95 g/cm$^3$. Additionally, the tube material has an Elmdorf tear strength, in the range of 9 g to 20 g, and preferably 20 g, in the molded direction, and in the range of 30 g to 400 g, and preferably 100 g, in the direction transverse to the mold direction. The tube material also has a tensile strength at break, of 7,000 psi to 13,000 psi, and preferably 10,000 psi, in the molded direction, and 6,000 psi to 10,000 psi, and preferably 9,000 psi, in the direction transverse to the mold direction. Also, the tube material has an elongation at break, of 250% to 500%, and preferably 400%, in the molded direction, and 300% to 700%, and preferably 500%, in the direction transverse to the mold direction. Tube materials were selected based on the results of the isostatic organic permeation study described in the Example below.

The HDPE resin material selected for the tubing, with a density in the range of 0.90 g/cm$^3$ to 0.99 g/cm$^3$, has large molecules that, when incorporated into a film, leave gaps smaller than those of conventional tube materials, thereby reducing the amount of odiferous gas that may penetrate the film. The result is better odor control and maximized barrier protection when used in a cassette.

The tube material has increased tear strength, in addition to a high molecular weight, enabling its use in an improved odor control cassette. Normally, as polyethylene density increases (to achieve higher modulus) other properties, such as tear strength, decrease. However, the tube material of the present invention has enhanced or high or increased tear strength, as well as high molecular weight. These characteristics enable the tube material to withstand twisting and insertion dynamics, without resultant breakage, that is necessary to the function of the cassette.

The film made from the resin material disclosed has a thickness in the range of 7 μm to 30 μm, depending on whether the film is manufactured as an infant film or toddler film. Toddler film is typically thicker than infant film, thereby providing superior barrier properties.

The film is blown to a lay-flat dimension via a blown film process. The gauge was kept constant thereby increasing barrier properties. The reduced gauge offers the opportunity for reduced raw materials, shipping and storage costs for the tubing material. Additionally, an increased amount of tubing can be fitted into each cassette, thereby prolonging use. A further benefit to the use of a HDPE resin material for cassette tubing is that HDPE is less expensive to manufacture than nylon materials typically employed in a cassette.

One commercially available HDPE material suitable for use in an improved odor control cassette is known as Alathon® XL5906 HDPE resin, marketed by Equistar. This HDPE is described in U.S. Pat. Nos. 5,962,598 and 6,147,167, both assigned to Equistar, and both patents are incorporated herein by reference. Alathon® XL5906 HDPE possesses the following typical properties:

| Property | Test Method | Units | Value |
|---|---|---|---|
| Density | ASTM D-1505 | g/cm$^3$ | 0.959 |
| Melt Index | ASTM D-1238 | g/10 min | 0.057 |
| Elmdorf Tear Strength, MD(TD) | 10(34) | g | D1922 |
| Tensile Strength @ Break, MD(TD) | 12,300(9,360) | psi | D822 |
| Elongation @ Break, MD(TD) | 300(350) | % | D822 |
| Secant Modulus, MD(TD) | 181,000(186,000) | psi | D822 |

Another suitable, commercially available linear polyethylene material is known as HiD® 9650 Blown Film Resin, marketed by Chevron. HiD® Blown 9650 Film Resin possesses the following typical properties:

| Property | Test Method | Units | Value |
|---|---|---|---|
| Density | ASTM D-1505 | g/cm$^3$ | 0.952 |
| Melt Index | ASTM D-1238 | g/10 min | 0.034 |
| Elmdorf Tear Strength, MD(TD) | 16(400) | g | D1922 |
| Tensile Strength @ Break, MD(TD) | 50,990(43,410) | Psi | D822 |
| Elongation @ Break, MD(TD) | 460(650) | % | D822 |
| Secant Modulus, MD(TD) | 709,670(826,800) | psi | D822 |

It should be noted that the odor control capabilities of the HDPE film used in the cassette may be enhanced by the addition of one or more deodorizers and/or fragrances. Additionally, for aesthetic reasons, the HDPE film may have a color or a design printed thereon.

EXAMPLE

An organic permeation study was undertaken to provide barrier characteristics of various films for human fecal matter. This data was developed by performing an isostatic transmission rate study.

The organic compounds shown in Table 1 were combined in equal amounts by volume. The multi-component mixture and the films were placed in a remote cell as illustrated in FIG. 1. The top sides of the films were continuously swept with a nitrogen carrier gas in order to prevent any decrease in concentration gradient across the film.

TABLE 1

Table 1 shows the organic permeants used for the permeation study.

| COMPOUND | CLASS |
|---|---|
| 1-Pentanethiol | C5 mercaptan |
| Valeric acid | C5 organic acid |
| p-cresol | Substituted phenol |
| Indole | Aromatic heterocycle |

The carrier gas stream was periodically monitored to determine whether equilibrium had been reached. Once equilibrium was achieved, the results were recorded. A MOCON ARMATRAN II equipped with a capillary column and a flame ionization detector (FID) was used for the analysis.

After all test films had reached equilibrium and the results had been recorded, the measuring instrument was calibrated to the four individual organic permeants: 1-Pentanethiol, valeric acid, p-cresol, and indole. A three-point calibration was used for each permeant.

The film was challenged with the permeant on one side, while the flux from the other side is swept to a liquid nitrogen cooled cryo-trap. The flux was concentrated in the cryo-trap and then flashed into a capillary column where the individual components were separated. The components were then quantified at the FID and the results were recorded. The transmission rate was calculated based on the component quantification, the area of sample, and the accumulation time in the cryo-trap.

A baseline was determined prior to the permeation study in order to isolate the permeants in question. The results are given for oxygen, water vapor and organic molecule transmission. For the results shown, the Chevron HiD® 9650 and Equistar XL5903 films exhibited the best barrier properties. Commercially used films, such as Formosa E905, Formosa FPC and Chevron 9640, behaved in a manner similar to one another and the co-extruded multiple layer CX film exhibited the worst barrier properties.

TABLE 2

Table 2 shows the organic transmission rate results.

| FILM | Transmission rate (μl/m$^2$-day) 1-Pentanethiol | Valeric acid | p-cresol | Indole | TOTAL |
|---|---|---|---|---|---|
| CX | $9.22 \times 10^6$ | $3.11 \times 10^4$ | $3.27 \times 10^4$ | $6.84 \times 10^5$ | $9.97 \times 10^6$ |
| Formosa E905 | $4.34 \times 10^6$ | $8.25 \times 10^3$ | $2.55 \times 10^4$ | $3.56 \times 10^5$ | $4.73 \times 10^6$ |
| Formosa FPC | $4.39 \times 10^6$ | $8.89 \times 10^3$ | $2.81 \times 10^4$ | $5.33 \times 10^5$ | $4.96 \times 10^6$ |
| Chevron 9640 | $4.51 \times 10^6$ | $6.18 \times 10^3$ | $2.70 \times 10^4$ | $2.61 \times 10^5$ | $4.80 \times 10^6$ |
| Chevron 9650 | $3.03 \times 10^6$ | $1.94 \times 10^4$ | $2.72 \times 10^4$ | $2.28 \times 10^5$ | $3.30 \times 10^6$ |

Figure 2:
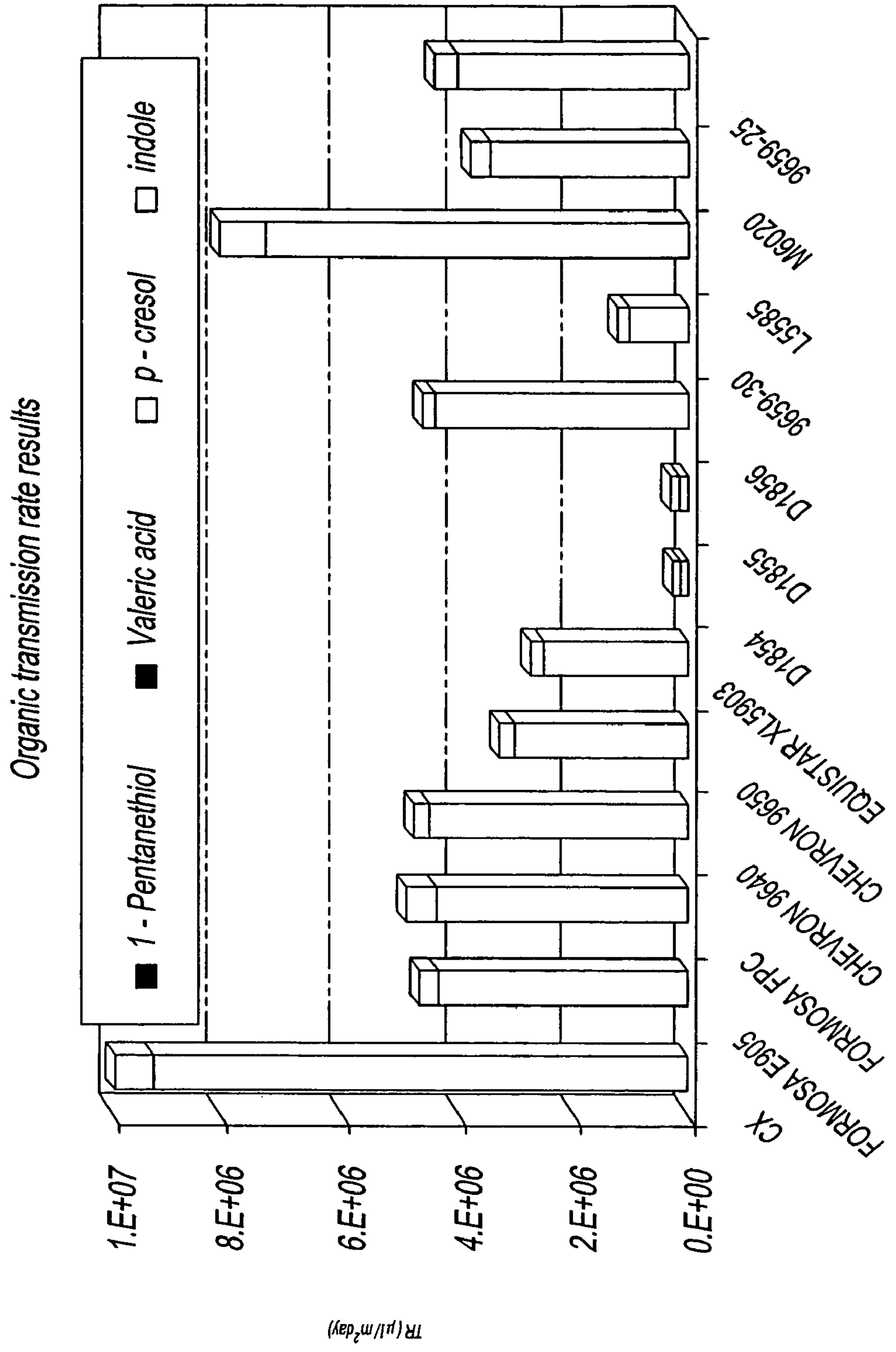
FIG. 2 illustrates organic transmission rate test results.

FIG. 2 is an illustration of the organic transmission rate test results, which shows that the Chevron HiD® 9650 film has superior barrier properties as compared to the Formosa films currently used in Diaper Genie cassettes. FIG. 2 further shows that Equistar XL5903 also has superior barrier properties as compared to the Formosa films.

Equistar Alathon® XL5906 HDPE resin has similar properties to Equistar XL5903 and, therefore, similarly provides improved barrier properties when compared with Formosa films. A separate study was undertaken to demonstrate the improved barrier of the Equistar Alathon® XL5906 HDPE resin as compared to the Formosa E905 film using pentanethiol as a permeant. The results are shown below in Table 3.

TABLE 3

| Film | Pentanethiol Transmission rate (μl/m$^2$-day) at 23° C. |
|---|---|
| Formosa E905 | 28.63 × 107 |
| Equistar Alathon ® XL906 | 19.59 × 107 |

The Formosa E905 film produced a transmission rate of 28.63×107 μl/m$^2$-day at 23° C. In contrast, the Equistar Alathon® XL906 produced a transmission rate of 19.59×107 μl/m$^2$-day at 23° C. The Equistar Alathon® XL906 produced substantially less transmission of pentanethiol and, therefore, has superior barrier properties compared to the Formosa E905 film.

The present invention has been described with particular reference to the preferred embodiments. It should be understood that the foregoing descriptions and examples are only illustrative of the invention. Various alternatives and modifications thereof can be devised by those skilled in the art without departing from the spirit and scope of the present invention. Accordingly, the present invention is intended to embrace all such alternatives, modifications, and variations that fall within the scope of the appended claims.

What is claimed is:

1. A cassette for holding waste in a waste disposal system, the cassette comprising: a body having a top, said body defining an annular space therein, said body being adapted to rotate in a container of the system a length of non-resilient flexible tubing positioned for use in a tight layer in said annular space, said tubing being a film having odor control capability for an amount of odiferous gas that penetrates said film, said tubing having high tear strength and being capable of being sealed, wherein said tubing is dispensed through the top of said body when said body rotates to seal said tubing thereby enclosing the waste, and wherein said film is formed of a high density polyethylene film resin with both a low melt index and a high density, wherein said tubing has an organic permeant transmission rate of less than about 3.3×10$^6$ μl/m$^2$-day, said organic permeant transmission rate being measured based upon transmission of 1-pentanethiol, valeric acid, p-cresol and indole.

2. The cassette of claim 1, wherein said tubing is a monolayer high density polyethylene film resin.

3. The cassette of claim 1, wherein said tubing has an Elmdorf tear strength in the range of 9 g to 20 g in the mold direction.

4. The cassette of claim 1, wherein said tubing has an Elmdorf tear strength in the range of 30 g to 400 g in the direction transverse to a mold direction.

5. The cassette of claim 1, wherein said tubing has a melt index in the range of 0.1 g/10 min to 0.50 g/10 min.

6. The cassette of claim 1, wherein said tubing has a tensile strength at break in a mold direction of 7,000 psi to 13,000 psi.

7. The cassette of claim 1, wherein said tubing has a tensile strength at break in a transverse direction of 6,000 psi to 10,000 psi.

8. The cassette of claim 1, wherein said tubing has an elongation at break in a mold direction of 250% to 500%.

9. The cassette of claim 1, wherein said tubing has an elongation at break in a transverse direction of 300% to 700%.

10. The cassette of claim 1, wherein said tubing has a thickness in the range of 7 μm to 30 μm.

11. The cassette of claim 1, wherein said tubing has a colorant added thereto.

12. The cassette of claim 1, wherein said non-resilient flexible tubing has a constant gauge.

13. The cassette of claim 1, wherein said tubing has a density in the range of 0.90 g/cm$^3$ to 0.99 g/cm$^3$.

14. The cassette of claim 13, wherein said density is about 0.90 g/cm$^3$.

15. A cassette for holding waste in a waste disposal system, the cassette comprising: a body having a top, said body defining an annular space therein, said body being adapted to rotate in a container of the system, a length of non-resilient flexible tubing positioned for use in a tight layer in said annular space, said tubing being a film having odor control capability of an amount of odiferous gas that penetrates said film and high tear strength and capable of being sealed, wherein said tubing is dispensed through the top of said body when said body rotates to seal said tubing thereby enclosing the waste, wherein said film is formed of a high density polyethylene film resin with both a low melt index and a high density and wherein said tubing has a deodorant added thereto.

16. The cassette of claim 15, wherein said tubing has an Elmdorf tear strength in the range of 9 g to 20 g in the mold direction and has an Elmdorf tear strength in the range of 30 g to 400 g in the direction transverse to a mold direction.

17. A cassette for holding waste in a waste disposal system, the cassette comprising: a body having a top, said body defining an annular space therein, said body being adapted to rotate in a container of the system, a length of non-resilient flexible tubing positioned for use in a tight layer in said annular space, said tubing being a film having odor control capability of an amount of odiferous gas that penetrates said film and high tear strength and capable of being sealed, wherein said tubing is dispensed through the top of said body when said body rotates to seal said tubing thereby enclosing the waste, wherein said film is formed of a high density polyethylene film resin with both a low melt index and a high density and wherein said tubing has a fragrance added thereto.

18. The cassette of claim 17, wherein said tubing has an Elmdorf tear strength in the range of 9 g to 20 g in the mold direction and has an Elmdorf tear strength in the range of 30 g to 400 g in the direction transverse to a mold direction.

19. The cassette of claim 17, wherein said tubing has an elongation at break in a transverse direction of 300% to 700%.

20. The cassette of claim 17, wherein said tubing has a colorant added thereto.

* * * * *